United States Patent [19]

Mäkinen

[11] 4,380,049

[45] Apr. 12, 1983

[54] METHOD AND APPARATUS FOR STOPPING AN ELEVATOR

[75] Inventor: Heimo Mäkinen, Hyvinkää, Finland

[73] Assignee: Elevator GmbH, Zug, Switzerland

[21] Appl. No.: 196,286

[22] Filed: Oct. 14, 1980

[30] Foreign Application Priority Data

Oct. 18, 1979 [FI] Finland .................................. 793228

[51] Int. Cl.[3] .......................... B66B 1/30; G06F 15/50

[52] U.S. Cl. .................................. 364/426; 187/29 R

[58] Field of Search ....................... 364/426; 187/29 R; 318/369, 461, 468, 473

[56] References Cited

U.S. PATENT DOCUMENTS 3,519,805 7/1970 Thorne-Booth .................... 364/426

3,893,695 7/1975 Rickert ........................... 364/426 X 4,034,856 7/1977 Wehrli et al. ..................... 187/29 R 4,102,436 7/1978 Kernick et al. .................. 187/29 R

*Primary Examiner*—Jerry Smith

*Attorney, Agent, or Firm*—Martin Smolowitz

[57] ABSTRACT

A procedure for exactly stopping an elevator at a desired point, which elevator is moving along a controlled path and is provided with stopping brake for controlling the time of start of the braking. Determination of the time for starting the braking is with the aid of direct and indirect measurement of the velocity of the elevator and with the aid of a logic unit (LU). This logic unit (LU) contains at least one central processing unit (CPU), a program memory (PM) and a data memory (DM), so that the central processing unit implements operations in accordance with commands stored in the program memory and reads information from the data memory and stores information in the data memory.

6 Claims, 3 Drawing Figures

METHOD AND APPARATUS FOR STOPPING AN ELEVATOR

BACKGROUND OF INVENTION

The present invention is directed to a method and apparatus for stopping an elevator moving along a controlled path, exactly at the desired point. The elevator is provided with a stopping brake and the above is carried out by controlling the time of commencement of braking.

The present invention concerns a procedure for stopping exactly at the desired point a means moving along a controlled path and provided with stopping brake, such as a lift, by controlling the time of commencement of braking.

The accuracy with which the lift stops at the storey floor level is one of the essential problems in lift technology and is receiving increasing attention. Lift use is indispensable for instance to a handicapped wheelchair patient; it is required in such cases that the stopping accuracy of the lift allows unimpeded passage into and out of the lift cage. It is also required with increasing frequency that slow and simple residential building lifts meet these requirements of accurate stopping. An acceptable stopping accuracy is about ±15 to ±20 mm.

The stopping accuracy of the lift cage is mainly dependent on the characteristics of the drive system driving the lift. In fast passenger lifts (over 1.0–1.5 m per second) a feedback-connected control system is commonly used, which endows the lift with good running characteristics and with good stopping accuracy as well. In slower lifts ($v \leqq 1.0$ m per second), the commonest drive system is a squirrel cage motor drive with either one or two speeds. The single-speed squirrel cage motor is the simplest and cheapest drive system, but its limitations are met in the accuracy of stopping, which is about ±70 mm when the nominal speed is 0.63 m/s. Since residential buildings constitute the main area where single-speed lifts are employed, it is consequently important that the stopping accuracy can be improved with a view to facilitating the lift travelling of aged and handicapped persons. The stopping accuracy of the single-speed lift has been improved by a procedure, where errors in stopping accuracy are caused by changes in the torque properties of the lift's brake.

It is possible with the so-called two-speed drive system to achieve the above-mentioned stopping accuracy of ±15 to ±20 mm. In such case the velocity of the lift cage is reduced before the storey floor level, to ¼ or 1/6 of the nominal speed, and final arrest is accomplished out of this lowered speed. However, the two-speed drive system has the drawback that the initial cost of the lift increases and furthermore, that replacement of single-speed lifts already in use by two-speed lifts is an expensive undertaking.

SUMMARY OF THE INVENTION

The prodecure of the invention aims to eliminate the drawbacks mentioned and to quite substantially improved the stopping accuracy of the single-speed lift, and thereby increase the use of these simple and economically favourable lift types. In the procedure of the invention, the changes of the factors affecting the stopping accuracy of the lift have been eliminated so that the lift cage will stop with sufficient accuracy under all and any conditions, independent of load, temperature of the drive machinery, temperature of the brake means or its state of wear or any other external factors. The procedure of the invention is characterized in that determination of the time to start braking is with the aid of direct or indirect measurement of the velocity of the means, and of a logic unit, the latter comprising at least a central unit, a program memory and a data memory so that the central unit will implement actions consistent with the commands stored in the program memory and read information from the data memory, and store information in the data memory. The advantage with the procedure to be employed is that one obtains substantial improvement of stopping accuracy, independent of external factors influencing the lift, as has already been related.

It is a further advantage that the procedure is applicable in improving the stopping accuracy of lifts already in use without the necessity to replace the drive system of the lift. Another advantage is reduced control called for by the lifts.

The procedure according to an embodiment of the invention is characterized in that in the determination of the time for braking to commence is taken into account, in addition to the measured speed, with the true braking distance calculated in at least one preceding braking. The advantage is that the apparatus is itself able to estimate with great reliability the braking distance which it needs, and few external controls are needed.

The procedure according to another embodiment of the invention is characterized in that in the determination of the time for braking to start there is taken into account the temperature of the drive mechanism of the apparatus, this being measured at one or several points in the machinery and/or estimated on the basis of the frequency of use calculated from the respective stationary times of the apparatus. For instance, measuring of the temperature of the lift brake is useful because the torque characteristics of the brake are dependent on temperature.

The procedure according to still one embodiment of the invention is characterized in that in the determination of the time for braking to start, the direction of travel of the apparatus is taken into account. The advantage is an accuracy better then heretofore because the characteristics of the lift brake may be different when the motor runs in different directions.

The procedure according to still another embodiment of the invention is characterized in that in the data bank contained in the logic unit there is gathered statistics of true braking distances of the apparatus, these statistics being utilized in the determination of the time for braking to start. The advantage is improved accuracy of stopping.

The procedure of still another embodiment of the invention is characterized in that the statistical information in the data memory can be preserved in the event of absence of the normal electrical supply. The advantage is then gained that even if the supply should fail no statistical information will be lost, and the apparatus may continue to operate reliably once the situation has become normal again.

The invention also concerns an apparatus for carrying out the procedure mentioned. The apparatus is characterized in that it consists of a logic unit comprising a central unit, a program memory and a data memory. Thereby the central unit contained in the logic unit is formed of at least one microprocessor. The advantage then is a low price compared with the benefits, because it is possible with the aid of a microprocessor to construct a highly advantageous computer. It is a further advantage that the apparatus is easily connectable to the control system of the lift. Moreover, the principle of operation of the procedure is such that the lift's individual properties are taken into account through the adaptive steering. These grounds make the apparatus particularly well suited for use as ancillary equipment to lifts already in existence, independent of the lift's structural details. The consequence of the aforementioned is a most remarkable expansion of the range of use.

DESCRIPTION OF THE DRAWINGS

In the following the procedure of the invention is described in greater detail with reference to the attached drawings, wherein.

DESCRIPTION OF THE INVENTION

Figure 1:
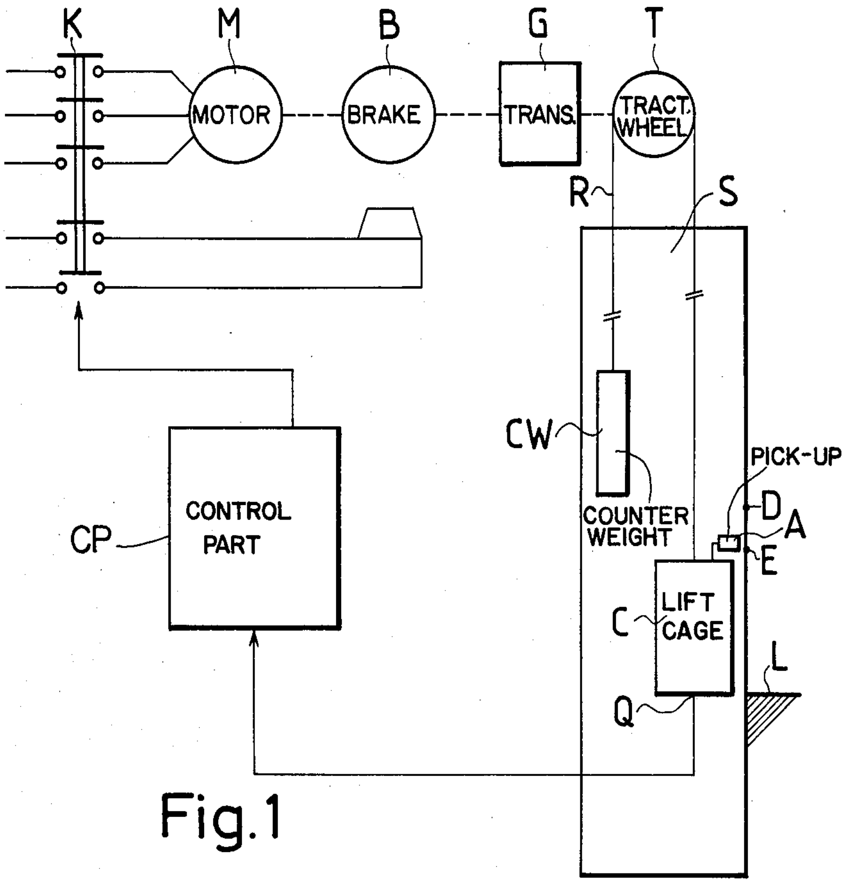
FIG. 1 displays the principle of a lift provided with single-speed squirrel cage motor.

When the relay K attracts its armature, motor M and brake B are energized. The brake B is, for instance, a belt brake with magnetic disengaging action which closes by spring force when the current of the magnet is interrupted. The motor M rotates the traction wheel T over the transmission G. The counterweight CW and the lift cage C are suspended by ropes from the traction wheel. When the motor rotates, the lift will move vertically in the lift shaft S. The lift cage carries, for the purpose of stopping, a pick-up A sensing in the lift shaft the point D. As the lift cage approaches the level L from above, the pick-up A supplies at the point D a signal to the control part CP. If it is desired to stop the lift at level L, the control part governs the relay K so that it is off, whereby the motor is without current and the brake control voltage is cut off. The brake closes after a period tB and stops the movement of the lift cage so that the lift cage glides to the level L. Point E in FIG. 1 represents that point where the pick-up A will be located when the lift cage has stopped exactly at level L. The distance D-E is the nominal braking distance sDE of the lift. The braking distance of the lift is in the first place dependent on the velocity of te lift cage at the point D, on the brake delay time tB, on the load Q of the lift cage and the direction of running, on the braking torque MB generated by the brake, on the mechanical losses torque ML of the lift and on the total moment of inertia J of the lift. The velocity v is also dependent on load, running direction, torque losses and the torque characteristics of the motor. The torque losses, the braking toque of the brake and the torque characteristics of the motor depend on temperature, degree of wear, and other external conditions, in a rather complex way.

The braking distance of the lift may be mathematically presented as follows:

$$s = \frac{2v - a_1 t_B}{2} t_B + \frac{(v - a_1 t_B)^2}{2a_B} \quad (1)$$

where a1 is the deceleration of the lift cage during the delay period tB and aB is the deceleration of the lift cage after the brake has closed. For the decelerations, the following formula is applicable:

$$a_1 = K_1 \frac{M_Q + M_L}{J} \quad (2)$$

and the formula $$a_B = K_1 \frac{M_B + M_Q + M_L}{J} \quad (3)$$

where K1 is a constant depending on the gear ratio of the transmission and MQ is the torque caused by the load in the lift cage on the motor shaft. Depending on running direction and load, MQ may assume positive or negative values. The range of variation of the braking distance s is s-min - s-max.

s=s-min when
  MQ=MQ-max (maximum value)
  ML=ML-max (D:o)
  MB=MB-max (D:o)
and then also
  v=v-min (minimum value) and
  a1=a1-max (maximum value)
  aB-32 aB-max (D:o)
s=s-max when
  MQ=MC-min (minimum value)
  ML=ML-min (D:o)
  MB=MB-min (D:o)
and then also
  v=v-max (maximum value)
  a1=a1-min (minimum value)
  aB=aB-min (minimum value)

The above-mentioned quantities assume typical values as follows, in lift operation:

| | | |
|---|---|---|
| nominal | $v_{nom}$ = | 0,63 m/s |
| velocity | $v_{min}$ = | 0,58 m/s |
| | $v_{max}$ = | 0,64 m/s |
| | $a_1 min$ = | $-0{,}1$ m/s$^2$ |
| | $a_1 max$ = | 0,4 m/s$^2$ |
| | $a_B min$ = | 0,7 m/s$^2$ |
| | $a_B max$ = | 1,2 m/s$^2$ |
| | $t_B$ = | 0,1 s |
| whereby | $s_{min}$ = | 178 mm |
| | $s_{max}$ = | 366 mm |

Half of the difference s-max - s-min represents the accuracy of stopping; in the exemplary case, the stopping accuracy is ±94 mm.

The principle by which the stopping can be made more accurate is the following:

Referring to FIG. 1, let the point D in the lift shaft be shifted to a place such that the distance sDE is slightly more (e.g. 20 to 50 mm more) than the largest braking distance s-max encountered. In the control part CP an apparatus is incorporated which forms the time delay Δt so that when the lift cage is moving towards the level at which it is required to stop, relay K releases its armature after the delay time Δt has passed since the lift cage passed the point D. The delay Δt shall vary with variations of the lift's load and of the other factors affecting the stopping accuracy in such manner that the following formula (4) is satisfied:

$$s = v \cdot \Delta t + \frac{2v - a_1 t_B}{2} t_B + \frac{(v - a_1 t_B)^2}{2a_B} \quad (4)$$

It is essential what way is chosen to determine Δt, because it is impossible in practice to find any exact mathematical form for all the variables in formula (4). We may write $$\Delta t = f_1 (V, M_Q, M_L, M_B, t_B) \quad (5)$$

$$v = f_2 (M_Q, M_L) \rightarrow M_L + M_Q = g_2(v) \quad (6)$$

Of the variables appearing in formulas (5) and (6), MQ alone is exactly definable with the aid of the load Q. The other quantities depend at least on temperature and degree of wear (on time) in a indefinite manner.

What follows, shows how Δt is determined by the procedure of the invention so that formula (4) can be made to be valid with sufficient accuracy.

Substitution of formula (6) in (5) yields for $$\Delta t := f_3(v, M_B, t_B) \quad (7)$$

If MB and tB are permanent constants, then $$\Delta t = t_4(v) \quad (8)$$

Formula (8) can be calculated if the torque graph of the motor is known. We may assume with fair accuracy that $$\Delta t = K_2(v - v_o) \quad (9)$$

where

K2=constant vo=constant

Thus, formula (9) allows Δt to be determined from the velocity v. The velocity v, again, is simple to measure on the lift. However, formula (9) is an inaccurate approximation, and above all it fails to take into account the variations of the braking torque MB.

But when a velocity measurement has been incorporated in the lift, it becomes possible herefrom to measure the braking distance occurring in each instance. Therefore, if Δt is determined by the simple estimation formula (9), one is enabled for each braking of the lift to measure the distance which the lift cage travels from the point D to the stopping point. In principle, this measurement is a speed integration process. When the result of measurement is compared with the distance sDE, which is a known constant, we obtain the information telling us how well the formula (9) was true. The error, if any, may be stored in memory and taken into account in the next runs. Hence, an adaptive system is created which modified the simple calculating process employing formula (9) to be such that the relationship between Δt and v is consistent with true values measured on the lift. Since the true relationship between Δt and v varies e.g. as the braking torque varies with varying temperature for instance, this circumstance can be taken into account as well. The brake temperature, and therefore the braking torque, depends in the first place on how frequently the lift is being used.

It is possible by measuring the frequency of use of the lift, to estimate the brake temperature, whereby in the relationship between Δt and v the frequency of use of the lift may be included, which is easy to measure.

An adaptive system of this kind will compensate for errors caused by any variable quantity.

Figure 2:
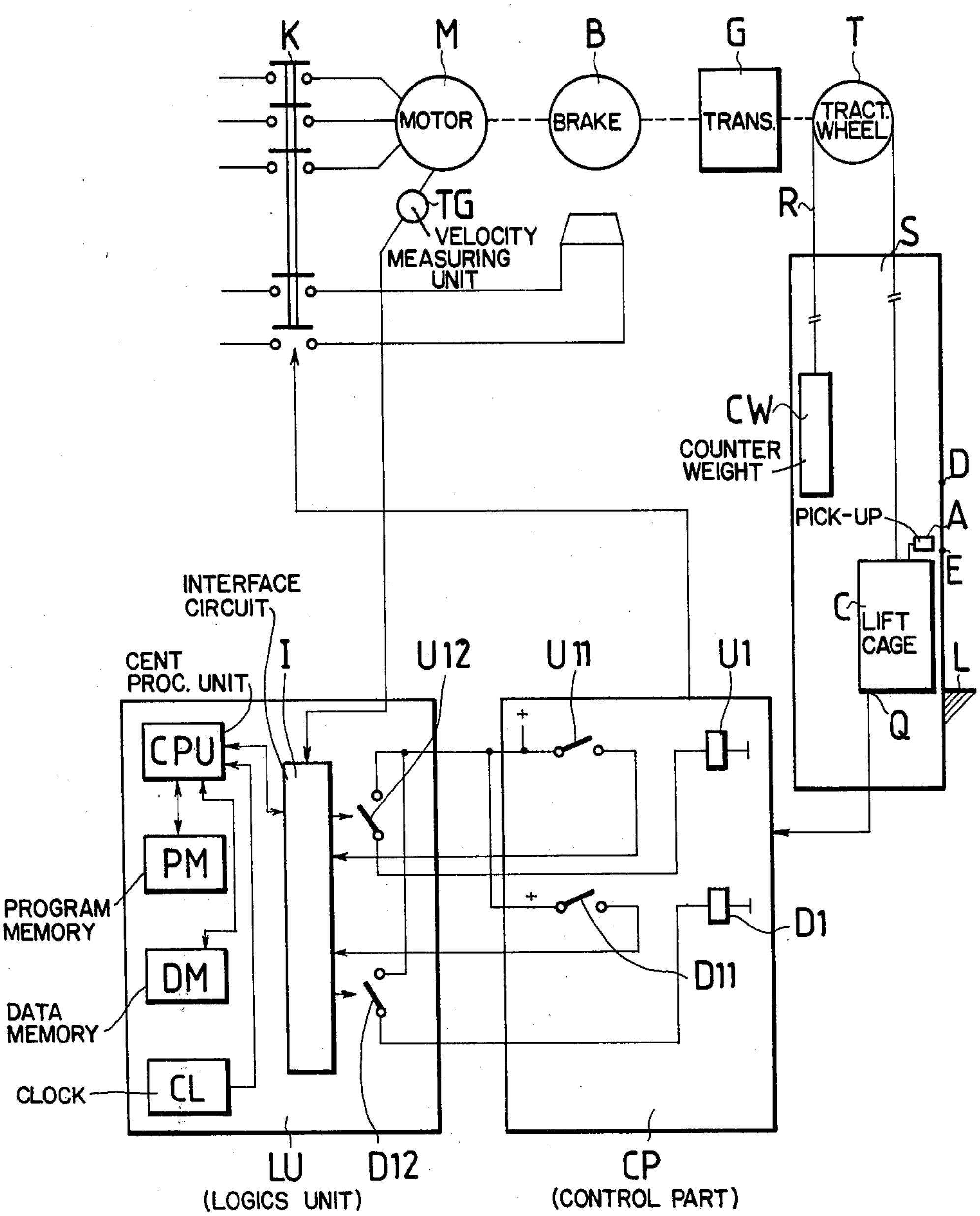
FIG. 2 presents an embodiment of the procedure of the invention.

With the aid of FIG. 2, there is described a mode of implementation by which the determination of an adaptive delay Δt such as has been described is possible. The node of implementation is characterized in that at a certain point in the lift assembly, there is measured a quantity which is directly or indirectly proportional to the velocity of the lift cage, so that the velocity can be calculated. With the aid of this quantity which is proportional to the velocity the true braking distance of the lift is measured, with the aid of which a statisticis are built up in the memory, and the delay time Δt is calculated with the aid of the velocity and of the statistics stored in the memory. An apparatus by means of which the procedure may be carried out comprises a velocity measuring unit TG, which may for instance be a digital pulse transmitter transmitting a pulse frequency proportional to the speed of rotation of the motor and where the pulse interval corresponds to a certain distance traversed by the lift cage; and a logics unit LU which is connected to the standard control system of the lift. The logics unit LU contains a central processing unit CPU which carries out the commands stored in the program memory PM (computations, control commands, etc.) and it reads and stores information in the data memory DM. The inteface circuit I transfers signals between pieces of apparatus outside the CPU and LU.

The clock CL governs the operation of the CPU and gives an exact time reference for the forming of the time delays. The detailed circuitry of the LU is not presented here because it is not essential with a view to the present invention and general design solutions therefor can be found in microprocessor technology.

Let us consider the operation of the equipment in the case where the lift cage is moving downward and with the invention to stop at the level L. Upward travel is accomplished in equivalent manner. While the lift cage is moving with constant velocity, the velocity measuring unit TG supplies a signal proportional to the velocity, and from which the LU computes the absolute velocity v. The computation may be periodic so that the velocity is determined at intervals of 0.1 sec for instance and the last value is stored in the data memory DM. The point D in the lift shaft has been so placed that if the relay K releases its armature at once when point D is reached, the lift cage will stop before the point E with all and any loads. As the lift cage reaches the point D, the relay D11 in the control system is deenergized with the aid of the signal from the pick-up A. Relay D11 gives a signal to the LU, causing the LU to implement the following:

- starts computing the distance from the velocity signal;
- waits through the fixed delay time Δto;
- computes, during the delay time Δ to, from the velocity v and with the aid of the statistics found in the data memory of preceding runs, the requisite delay time Δt (formula (9));
- keeps relay D12 energized, thus D1 energized as well, and the lift continues its normal travel;
- computes for later use the time Δt–Δto and stores this in memory DM.

On expiration of the delay Δto, the LU still keeps relay D12 energized during the period Δt–Δto. After this time also has passed, relay D12 releases its armature deenergizing relay D1, which causes relay K to release, when then the lift begins to stop. All through the deceleration phase the LU computes, from the velocity signal, the braking distance, starting from point D. This computation keeps on until the velocity signal indicates that the lift has stopped. After the lift has stopped, the LU compares the braking distance which it has computed, with the given distance sDE. If a difference exists, the LU computes which would have been the value of Δt with which the stopping would have been exact. This value of Δt is stored in the data memory DM together with that velocity v at which the lift cage was moving as it arrived at the point D.

When the lift cage is stationary, the LU counts the standing time and stores it in the data memory, which naturally contains data of the standing times at previous stoppings. From these standing times, the LU computes the starting frequency of the lift, which in practice reflects the temperature of the lift machinery. When the lift is next started, the data memory contains the information regarding the starting frequency at that time. This starting frequency can be utilized at the storing of the correct Δt values consistent with the measured braking distance by classifying the values, by starting frequency, into two or more classes (for instance three classes: hot—warm—cold). This classification is of significance particularly when the lift remains, at the end of high traffic, standing for prolonged periods, e.g. over night, where the machinery cools down to be cold.

When the lift next starts, for instance in the morning, its running characteristics (i.e. the brake torque and machinery losses) are potentially greatly different from those in the preceding runs. But with the aid of the starting frequency classification the LU will still assign a value to Δt which is based on the information telling how the lift cage last stopped while the machinery was cold—let us say on the morning of the preceding day.

The correct Δt values calculated on the basis of the braking distances measured by the LU, and the corresponding values of the velocity v, may furthermore be classified according to the direction of travel of the lift cage. This is useful because the properties of the lift brake may differ with different directions of rotation of the motor. If the direction of travel and the starting frequency classifications both are incorporated, the data memory will have e.g. 6 classes:

cold up
warm up
hot up
cold down
warm down
warm up.

Figure 3:
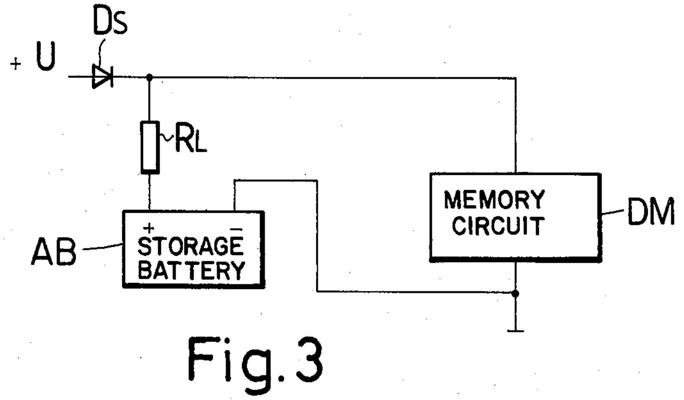
FIG. 3 shows a design enabling the statistical data stored in the data memory to be retained in the event of electrical mains failure.

The design of the data memory DM is usually such that the memory is set to zero when the voltage supply to the apparatus is interrupted. Therefore even a brief mains failure will destroy the statistical data by which the computation of Δt by formula (9) is corrected. This may possibly cause stopping errors of the lift cage in a few runs after the electricity failure. But it is possible to retain the statistical data past electrical failure periods e.g. with the aid of a storage battery or by a method wherein at regular intervals certain circuits charge the data in the data memory into memory circuits of such type where the information is preserved even without voltage supplies, as it is in the program memory. Both techniques are commonly known for instance in microprocessor technology. FIG. 3 illustrates a possible solution to the problem. The normal supply voltage +U of the memory circuit DM is conducted to the memory circuit over a diode Ds. The storage battery AB is charged from the voltage +U over the resistor RL. If voltage +U becomes zero, then the battery voltage will supply power to the memory circuit DM over the resistor RL. An appropriate type of storage battery is, for instance, a nickel-cadmium battery. When a CMOS semiconductor circuit is used for memory circuit, which has an exceedingly low current demand, the information will be held in memory several hours.

It is obvious to a person skilled in the art that different embodiments of the invention are not exclusively confined to the example presented above, and that the embodiments may vary within the scope of the claims presented hereinbelow. For instance, the procedure may also be applied to other than single-speed lift types, provided that the stopping of the lift is by the aid of some kind of brake means. It is further possible to monitor the temperature of the lift machinery by means of an electrical pick-up and to connect this measurement data to the logics unit. For instance, measuring of the lift brake temperature is useful. In that case, the temperature that is measured may for instance be one of the classification criteria in the statistics, instead of the counted starting frequency.

What is claimed:

1. A method for causing an elevator car in motion to stop at a pre-determined position along a guided hoistway, without using feedback or programmed signals to the travel of said car after initiation of a braking stroke, said elevator car being powered to initiate and sustain motion, and being coupled to a stopping brake for stopping the motion of said car, said method for braking comprising the steps of: actuating said brake to initiate its braking stroke at an appropriate point in time, for causing said car in motion to stop at said predetermined position, and controlling said point in time for actuating said brake by and in direct relation to conditioning signals being sensed, co-generated, accumulated, compared and stored prior to each braking stroke; conditioning said signals through changes of forces acting on velocity of an unbraked elevator car, including loaded weight of said car, motive power changes, direction of travel, and mechanical function; and changes of forces acting on said stopping brake performance including: brake temperature, wear, direction of braking, mechanical friction, brake-spring tension, velocity and load weight of said car being stopped.

2. A method according to claim 1 comprising the steps of: determining the time for starting braking action by measuring elevator velocity and true braking distance computed from at least one preceding braking operation.

3. A method according to claim 1 comprising the steps of: measuring the temperature of drive means powering said elevator car at, at least one point in said drive means in response to frequency of use computed from stationary times of said elevator car.

4. A method according to claim 1 comprising the steps of: determining the time for starting elevator car braking action in response to direction of motion of said elevator car.

5. A method according to claim 1 comprising the steps of: accumulating a statistical data base reflecting true braking distances of said elevator car, and utilizing said data base in determining the time for initiation of braking action of said elevator car.

6. A device in combination with a conventional elevator car system including an electrical drive motor, an electrically actuated stopping brake, an electrical control panel, and an electric car positioning sensor, said drive being adapted to electrically cause said control panel to initiate a stop signal to said stopping brake at a point in time necessary to stop said elevator car at a predetermined position, and being capable of sensing, co-generating, accumulating, comparing, and storing reference and conditioning signals prior to the time of a last stop signal and after said elevator car is fully stopped, in order to compute a proper point in time to actuate said brake to start a braking stroke, said device including: a velocity sensor for producing an electric output signal that varies in direct relation to changes in velocity of said elevated car in motion; a logic unit employing conventional design techniques and including a clock unit, a data memory unit, a program memory unit, a central processing unit, and an interface circuit configured to accept signals from said velocity sensor and said control panel, to establish a data base, said data base being constantly updated by said conditioning signals derived from each preceding stop, which when combined with signals from said velocity sensor provides determination for initiation of said brake stroke at a proper point in time; and electrical interconnect to connect said device to said elevator car system.

* * * * *